(12) United States Patent
Ishii et al.

(10) Patent No.: US 11,086,629 B2
(45) Date of Patent: Aug. 10, 2021

(54) MISPREDICTION OF PREDICTED TAKEN BRANCHES IN A DATA PROCESSING APPARATUS

(71) Applicant: Arm Limited, Cambridge (GB)

(72) Inventors: Yasuo Ishii, Austin, TX (US); Muhammad Umar Farooq, Austin, TX (US); Chris Abernathy, Austin, TX (US)

(73) Assignee: ARM Limited, Cambridge (GB)

( * ) Notice: Subject to any disclaimer, the term of this patent is extended or adjusted under 35 U.S.C. 154(b) by 188 days.

(21) Appl. No.: 16/185,073

(22) Filed: Nov. 9, 2018

(65) Prior Publication Data

US 2020/0150967 A1    May 14, 2020

(51) Int. Cl.
  *G06F 9/38*    (2018.01)
  *G06F 9/30*    (2018.01)
(52) U.S. Cl.
  CPC ........ *G06F 9/3806* (2013.01); *G06F 9/30058* (2013.01); *G06F 9/3851* (2013.01)
(58) Field of Classification Search
  None
  See application file for complete search history.

(56) References Cited

U.S. PATENT DOCUMENTS

| | | | | |
|---|---|---|---|---|
| 5,142,634 A | * | 8/1992 | Fite ..................... | G06F 9/3806 712/237 |
| 5,265,213 A | * | 11/1993 | Weiser ................. | G06F 9/3844 712/207 |
| 5,752,014 A | * | 5/1998 | Mallick ................ | G06F 9/3848 712/240 |

(Continued)

FOREIGN PATENT DOCUMENTS

| | | | |
|---|---|---|---|
| CN | 101916184 A | * 12/2010 | |
| EP | 2549376 A1 | * 1/2013 | ........... G06F 9/3806 |
| WO | WO-2013014012 A1 | * 1/2013 | ........... G06F 9/3806 |

OTHER PUBLICATIONS

'Dynamic Branch Prediction—ECE 570 High Performance Computer Architecture' from Ben Lee, archived on Nov. 16, 2017. (Year: 2017).*

(Continued)

*Primary Examiner* — Steven G Snyder
(74) *Attorney, Agent, or Firm* — Nixon & Vanderhye, P.C.

(57) ABSTRACT

Apparatus and a method of operating the same is disclosed. Instruction fetch circuitry is provided to fetch a block of instructions from memory and branch prediction circuitry to generate branch prediction indications for each branch instruction present in the block of instructions. The branch prediction circuitry is responsive to identification of a first conditional branch instruction in the block of instructions that is predicted to be taken to modify a branch prediction indication generated for the first conditional branch instruction to include a subsequent branch status indicator. When there is a subsequent branch instruction after the first conditional branch instruction in the block of instructions that is predicted to be taken the subsequent branch status indicator has a first value, and otherwise the subsequent branch status indicator has a second value. This supports improved handling of a misprediction as taken.

17 Claims, 7 Drawing Sheets

(56) References Cited

U.S. PATENT DOCUMENTS

| | | | | |
|---|---|---|---|---|
| 5,796,998 | A * | 8/1998 | Levitan | G06F 9/3806 712/206 |
| 5,815,700 | A * | 9/1998 | Poplingher | G06F 9/3844 712/240 |
| 5,838,962 | A * | 11/1998 | Larson | G06F 9/3844 712/239 |
| 5,918,044 | A * | 6/1999 | Levitan | G06F 9/3804 711/125 |
| 5,941,985 | A * | 8/1999 | Talcott | G06F 9/3848 712/240 |
| 5,978,906 | A * | 11/1999 | Tran | G06F 9/3806 712/239 |
| 6,014,742 | A * | 1/2000 | Krick | G06F 9/3802 712/233 |
| 6,073,230 | A * | 6/2000 | Pickett | G06F 9/3806 711/E12.018 |
| 6,134,649 | A * | 10/2000 | Witt | G06F 9/30021 711/E12.043 |
| 6,157,998 | A * | 12/2000 | Rupley, II | G06F 9/3844 712/23 |
| 6,185,674 | B1 * | 2/2001 | Chan | G06F 9/322 712/230 |
| 6,324,643 | B1 * | 11/2001 | Krishnan | G06F 9/30058 712/237 |
| 6,374,348 | B1 * | 4/2002 | Irie | G06F 9/30058 712/237 |
| 6,477,639 | B1 * | 11/2002 | Krishnan | G06F 9/30058 712/233 |
| 6,477,640 | B1 * | 11/2002 | Rupley, II | G06F 9/3844 712/216 |
| 6,598,152 | B1 * | 7/2003 | Sinharoy | G06F 9/3848 712/215 |
| 6,745,323 | B1 * | 6/2004 | Sinharoy | G06F 9/3848 712/233 |
| 7,000,096 | B1 * | 2/2006 | Sinharoy | G06F 9/3848 712/239 |
| 7,441,110 | B1 * | 10/2008 | Puzak | G06F 8/4442 712/207 |
| 7,523,298 | B2 * | 4/2009 | Gschwind | G06F 9/3844 712/239 |
| 7,590,830 | B2 * | 9/2009 | Chaudhry | G06F 9/3806 711/204 |
| 7,890,738 | B2 * | 2/2011 | Eisen | G06F 9/5011 712/239 |
| 8,255,669 | B2 * | 8/2012 | Gschwind | G06F 9/3804 712/205 |
| 8,521,999 | B2 * | 8/2013 | Emma | G06F 9/30145 712/240 |
| 9,122,486 | B2 * | 9/2015 | Venkumahanti | G06F 9/3844 |
| 9,348,599 | B2 * | 5/2016 | Busaba | G06F 9/3804 |
| 9,477,479 | B2 * | 10/2016 | Greenhalgh | G06F 9/3804 |
| 9,519,485 | B2 * | 12/2016 | Busaba | G06F 9/3851 |
| 10,175,982 | B1 * | 1/2019 | Blasco | G06F 9/3806 |
| 10,209,993 | B2 * | 2/2019 | Wang | G06F 12/0875 |
| 10,241,557 | B2 * | 3/2019 | Blasco | G06F 1/324 |
| 10,698,691 | B2 * | 6/2020 | Havlir | G06F 9/3848 |
| 10,831,482 | B2 * | 11/2020 | Akizuki | G06F 9/3842 |
| 10,936,318 | B2 * | 3/2021 | Fatehi | G06F 9/3848 |
| 2004/0003217 | A1 * | 1/2004 | Ukai | G06F 9/3806 712/239 |
| 2006/0161762 | A1 * | 7/2006 | Eisen | G06F 9/3844 712/233 |
| 2007/0192574 | A1 * | 8/2007 | Park | G06F 1/32 712/239 |
| 2007/0239974 | A1 * | 10/2007 | Park | G06F 9/3848 712/238 |
| 2008/0005542 | A1 * | 1/2008 | Gschwind | G06F 9/3844 712/239 |
| 2008/0077781 | A1 * | 3/2008 | Smith | G06F 9/3861 712/239 |
| 2008/0120496 | A1 * | 5/2008 | Bradford | G06F 9/30094 712/239 |
| 2008/0209190 | A1 * | 8/2008 | Bhargava | G06F 9/3844 712/240 |
| 2009/0271597 | A1 * | 10/2009 | Kuesel | G06F 9/3844 712/240 |
| 2010/0228957 | A1 * | 9/2010 | Rabinovitch | G06F 9/3844 712/238 |
| 2012/0117327 | A1 * | 5/2012 | Venkumahanti | G06F 9/3844 711/125 |
| 2012/0290821 | A1 * | 11/2012 | Shah | G06F 9/3848 712/240 |
| 2013/0311760 | A1 * | 11/2013 | Kothari | G06F 9/3844 712/240 |
| 2014/0164748 | A1 * | 6/2014 | Dundas | G06F 9/3806 712/237 |
| 2014/0201508 | A1 * | 7/2014 | Busaba | G06F 9/38 712/239 |
| 2014/0372736 | A1 * | 12/2014 | Greenhalgh | G06F 9/3806 712/239 |
| 2015/0169041 | A1 * | 6/2015 | Blasco | G06F 9/3806 713/320 |
| 2017/0242701 | A1 * | 8/2017 | Fleischer | G06F 9/3848 |
| 2018/0060074 | A1 * | 3/2018 | Havlir | G06F 9/30058 |
| 2018/0101385 | A1 * | 4/2018 | Wang | G06F 9/3848 |
| 2018/0173534 | A1 * | 6/2018 | Peled | G06F 9/30076 |
| 2019/0079771 | A1 * | 3/2019 | Jung | G06F 9/381 |
| 2019/0377576 | A1 * | 12/2019 | Akizuki | G06F 9/30181 |
| 2019/0384612 | A1 * | 12/2019 | Evers | G06F 9/3844 |
| 2020/0110611 | A1 * | 4/2020 | Ishii | G06F 9/30058 |
| 2020/0150968 | A1 * | 5/2020 | Fatehi | G06F 9/30058 |
| 2021/0034370 | A1 * | 2/2021 | Evers | G06F 9/35 |

OTHER PUBLICATIONS

'Branch Prediction Mechanism' IP.com No. IPCOM000068385D, Original Publication Date: Dec. 1, 1979. (Year: 1979).*
'Data Alignment' by Song Ho Ahn, 2012. (Year: 2012).*

* cited by examiner

| PREDICTED TAKEN | PREDICTED TAKEN FOLLOWS IN BLOCK | BRANCH TARGET INFO |
|---|---|---|
| 0x110 (BEQ) | 0 | — |

MISPREDICTION OF PREDICTED TAKEN BRANCHES IN A DATA PROCESSING APPARATUS

TECHNICAL FIELD

The present disclosure relates to data processing. In particular, the present disclosure relates to branch prediction in a data processing apparatus.

DESCRIPTION

A data processing apparatus which executes instructions which include branch instructions may be arranged with the capability to predict in advance (i.e. before execution and branch resolution) whether a branch will be taken or not. This allows the prefetching capability of the data processing apparatus to retrieve instructions from memory in advance of those instructions being required for execution (in order to avoid the latency associated with retrieval of these instructions from memory), despite the fact that the instructions include branch instructions which can cause the execution flow to deviate from sequential instruction execution when jumping from a branch instruction to a (possibly significantly separate in program order) target instruction thereof. Generally such branch prediction can operate with a relatively high level of accuracy, but it is inevitable that on occasions a branch prediction will be incorrect. When this happens it is then required for the branch prediction mechanism (and the instruction fetch mechanism) to redirect itself to the correct next instruction, i.e. not that which was originally predicted.

SUMMARY

In one example embodiment described herein there is an apparatus comprising: instruction fetch circuitry to fetch a block of instructions from memory; and branch prediction circuitry to generate branch prediction indications for each branch instruction present in the block of instructions, wherein the branch prediction circuitry is responsive to identification of a first conditional branch instruction in the block of instructions that is predicted to be taken to modify a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

In one example embodiment described herein there is a method of branch prediction in a data processing apparatus comprising: fetching a block of instructions from memory; generating branch prediction indications for each branch instruction present in the block of instructions; identifying a first conditional branch instruction in the block of instructions that is predicted to be taken; and modifying a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

In one example embodiment described herein there is an apparatus comprising: means for fetching a block of instructions from memory; means for generating branch prediction indications for each branch instruction present in the block of instructions; means for identifying a first conditional branch instruction in the block of instructions that is predicted to be taken; and means for modifying a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: instruction fetch circuitry to fetch a block of instructions from memory; and branch prediction circuitry to generate branch prediction indications for each branch instruction present in the block of instructions, wherein the branch prediction circuitry is responsive to identification of a first conditional branch instruction in the block of instructions that is predicted to be taken to modify a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

The branch prediction circuitry of the apparatus enables the instruction fetch circuitry to fetch blocks of instructions from memory in an order which may deviate from a sequential sequence of blocks. This happens when the branch prediction circuitry encounters a branch instruction in a block of instructions for which its prediction is that the branch will be taken and this can then enable the instruction fetch circuitry to be redirected to fetch a next block of instructions from memory which contains the target instruction of that predicted taken branch instruction. The instruction fetch circuitry is arranged to fetch blocks of instruction from memory (rather than for example individual instructions) because this brings efficiencies in terms of both the memory transactions required and the prediction generations performed by the branch prediction circuitry.

In this context the inventors have realised that, where the branch prediction circuitry generates predictions for each branch instruction in a block of instructions currently under consideration, branch predictions for branch instructions which follow the first predicted taken branch in the block are originally generated, but typically then lost when an earlier branch instruction present in the block of instructions is predicted as taken. The present techniques address this by provided branch prediction circuitry which modifies a branch prediction indication generated for the first conditional branch instruction within the block to include a further indication relating to the status of subsequent branches in the block. This subsequent branch status indicator is arranged, when there is a branch instruction which follows the first predicted taken branch in a block of instruction and it is predicted to be taken, to have a first value and otherwise to have a second value. This information associated with the branch prediction for the predicted taken branch may be variously used, but in particular may be of benefit when subsequent branch resolution reveals that the predicted taken branch was mispredicted, i.e. in fact that branch was not taken. This then means that the instruction flow should in fact not jump out of this block of instructions (to the target of the branch instruction when taken), but rather should continue sequential instruction execution within the block. It is then beneficial to know, as early as possible, whether that sequential execution flow continues to the end of the block or whether within the remainder of the instructions within the block there is another predicted taken branch which will also cause the instruction flow to jump out of the block. The subsequent branch status indicator provides this information.

In order to make use of the information captured in the subsequent branch status indictor, the apparatus may comprise various further components, but in some embodiments the apparatus further comprises branch resolution circuitry to determine a resolution status for branch instructions, and the branch prediction circuitry is responsive to a not-taken resolution status determined by the branch resolution circuitry for the first conditional branch instruction in the block of instructions to proceed with generating branch prediction indications: from a first instruction of a next block of instructions which subsequently follows the block of instructions, when the subsequent branch status indicator has the second value: and from a first instruction of a target block of instructions to which the subsequent branch instruction leads, when the subsequent branch status indicator has the first value.

Accordingly the branch prediction circuitry then receives information from the branch resolution circuitry on the definitive outcome of execution of branch instructions for which it generated a taken prediction. In particular the branch prediction circuitry receives information from the branch resolution circuitry relating to branch instructions for which it generated a taken prediction, but it turned out that the branch was in fact not taken. Under these circumstances the branch prediction circuitry then makes reference to the subsequent branch status indictor associated with that predicted taken branch to determine how the flow of the instruction fetch and the branch prediction should then proceed. In the event that the indicator has the second value, i.e. indicting that no further branches were predicted as taken in the remainder of the block, then on that basis the branch prediction can continue from the next block of instructions which subsequently follows the block of instructions in which the mispredicted taken branch is found. This avoids the need to regenerate a branch prediction for these subsequent branches in the block, when this action has already been carried out and has determined that none of them are predicted as taken (and thus do not lead to an instruction flow jump). Moreover, where the instruction fetch circuitry is arranged to fetch instructions in blocks from memory (with the efficiencies generally associated therewith) this further avoids the inefficiency of fetching only a partial block containing the subsequent instructions (or indeed fetching the entire block containing the subsequent instructions). Conversely, when the indicator has the first value this indicates that a subsequent branch instruction in the remainder of the block is predicted as taken and the instruction fetch and branch prediction should jump to the target of that subsequent predicted taken branch. The subsequent branch status indicator may be variously configured, but in some example embodiments it is provided by a single bit indicating either the first value or the second value. This then means that this additional information to be captured with respect to predicted taken branches can be done so efficiently and with a minimum of additional storage required.

In order to be able to efficiently and quickly provide target addresses to which predicted taken branches are predicted to jump, the apparatus may be provided with branch target storage, for example as a dedicated storage component or for example in the form of a branch target buffer (BTB), possibly comprising several hierarchical levels of storage. Hence in some example embodiments the apparatus further comprises branch target storage, wherein the branch prediction circuitry is further responsive to the identification of the first conditional branch instruction in the block of instructions that is predicted to be taken, when there is the subsequent branch instruction after the first conditional branch instruction in the block of instructions that is predicted to be taken, to cause a target address of the subsequent branch instruction to be stored in the branch target storage. Accordingly, to further support the efficient redirection of the branch prediction circuitry when it is found that the first predicted taken branch in the block was mispredicted, the target address of a subsequent predicted taken branch can be caused to be stored in the branch target storage. Choosing whether to do this or not is an implementation choice, because assuming that the prediction of the first branch instruction as taken is correct then this target address of the subsequent branch instruction is not expected to be used (at least at this specific point in instruction flow).

For example, the choice of whether to cause the target address of a subsequent predicted taken branch to be stored in the branch target storage may be based on how reliable the prediction as taken of the first branch in the block is considered to be. Accordingly in some example embodiments the branch prediction circuitry comprises branch prediction confidence circuitry to generate a prediction confidence indication in association with each branch prediction indication which it generates, and wherein storage of the target address of the subsequent branch instruction in the branch target storage is dependent on a value of the prediction confidence indication. Thus where the prediction confidence indication shows a relatively high confidence in the taken prediction of the first branch instruction in the block (e.g. based on a history of consistent taken status for that branch) then it may be considered not to be worthwhile to cause the target of a subsequent predicted taken branch in the block to be stored in the branch target storage (and use up valuable storage space therein). Conversely where the confidence in the prediction of the first predicted taken branch in the block is relatively low, then it may be determined that storage of the target address of the subsequent predicted taken branch in the block is indeed worthwhile.

The generation of confidence indications in association with branch predictions may be variously configured, and the assessment associated therewith of what is considered to be a more confident prediction versus a less confident prediction as well. However, in some example embodiments the branch prediction circuitry is responsive to the value of the prediction confidence indication not being above a predetermined threshold value to cause the target address of the subsequent branch instruction to be stored in the branch target storage.

Conversely in some example embodiments the branch prediction circuitry is responsive to the value of the prediction confidence indication being above a predetermined threshold value to prevent the target address of the subsequent branch instruction from being stored in the branch target storage.

Further the branch prediction circuitry may be arranged to treat its predictions for certain branches as being associated with a high confidence that they are correct and accordingly in some embodiments the branch prediction confidence circuitry is responsive to an unconditional branch to generate the prediction confidence indication in association with the unconditional branch with a value above the predetermined threshold value.

The prediction confidence which the branch prediction confidence circuitry generates in association with each branch prediction may alternatively, or in addition, be based on other factors as well. For example in some embodiments storage of the target address of the subsequent branch instruction in the branch target storage is dependent on a relative priority of an agent executing the block of instructions. Accordingly within an apparatus which allows various agents to execute instructions, those agents may be given varying levels of respective importance or priority, and whether or not to store the target address of the subsequent branch instruction in the branch target storage can be made dependent on that relative priority. For example, this then means that certain agents (associated with a high priority) can more often (even frequently, or always) have such target addresses stored in the branch target in storage to ensure that when this prediction of a first branch instruction as taken within a block of instructions occurs that any delays associated with redirecting the fetch and branch prediction mechanisms can be reduced, and the speed with which the execution of instructions can accurately continue is improved.

There are various contexts in which the apparatus may allow different agents to execute instructions, but in example embodiments the agent executing the block of instructions is a thread within a multi-threaded execution environment. Accordingly the storage of the target address of the subsequent branch instruction in the branch target storage can be made dependent on which thread is currently executing, giving some threads this preferential additional use of the branch target storage, but not others.

One mechanism by which the storage of the target address of subsequent branch instructions which are predicted to be taken can be implemented is by the use of the above mentioned branch prediction confidence, and accordingly in some example embodiments the branch prediction circuitry comprises branch prediction confidence circuitry to generate a prediction confidence indication in association with each branch prediction indication which it generates, and the branch prediction circuitry is responsive to the relative priority of an agent executing the block of instructions when generating the value of the prediction confidence indication, and the branch prediction circuitry is responsive to the value of the prediction confidence indication being below a predetermined threshold value to cause the target address of the subsequent branch instruction to be stored in the branch target storage.

The instruction fetch circuitry may be arranged to perform its fetching of instructions, and in particular the groups of instructions which it fetches, in a variety of ways, but in some example embodiments the instruction fetch circuitry is arranged to fetch a pair of blocks comprising the block of instructions from memory, and the branch prediction circuitry is arranged to generate branch prediction indications for each branch instruction present in the pair of blocks of instructions.

Further, the manner in which the branch prediction circuitry processes a block of instructions fetched by the instruction fetch circuitry may be variously configured, but in some example embodiments the branch prediction circuitry is arranged to generate branch prediction indications for each branch instruction present in the block of instructions in a single processing cycle. In other words, the branch predictions for each branch prediction in the block is parallelised, such that a prediction for each instruction retrieved in a single block may be generated in a single processing cycle.

As mentioned the grouping of instructions into a block may be variously defined according to the requirements of the system implemented, but in some embodiments the block of instructions is aligned to a predefined multiple-byte boundary in memory. For example such blocks of instructions may be a 32-byte aligned.

In accordance with one example configuration there is provided a method of branch prediction in a data processing apparatus comprising: fetching a block of instructions from memory; generating branch prediction indications for each branch instruction present in the block of instructions; identifying a first conditional branch instruction in the block of instructions that is predicted to be taken; and modifying a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

In accordance with one example configuration there is provided an apparatus comprising: means for fetching a block of instructions from memory; means for generating branch prediction indications for each branch instruction present in the block of instructions; means for identifying a first conditional branch instruction in the block of instructions that is predicted to be taken: and means for modifying a branch prediction indication generated for the first conditional branch instruction to include a subsequent branch status indicator, wherein when there is a subsequent branch instruction after the first conditional branch instruction in the block of instructions that is predicted to be taken the subsequent branch status indicator has a first value, and otherwise the subsequent branch status indicator has a second value.

Particular embodiments will now be described with reference to the figures.

Figure 1:
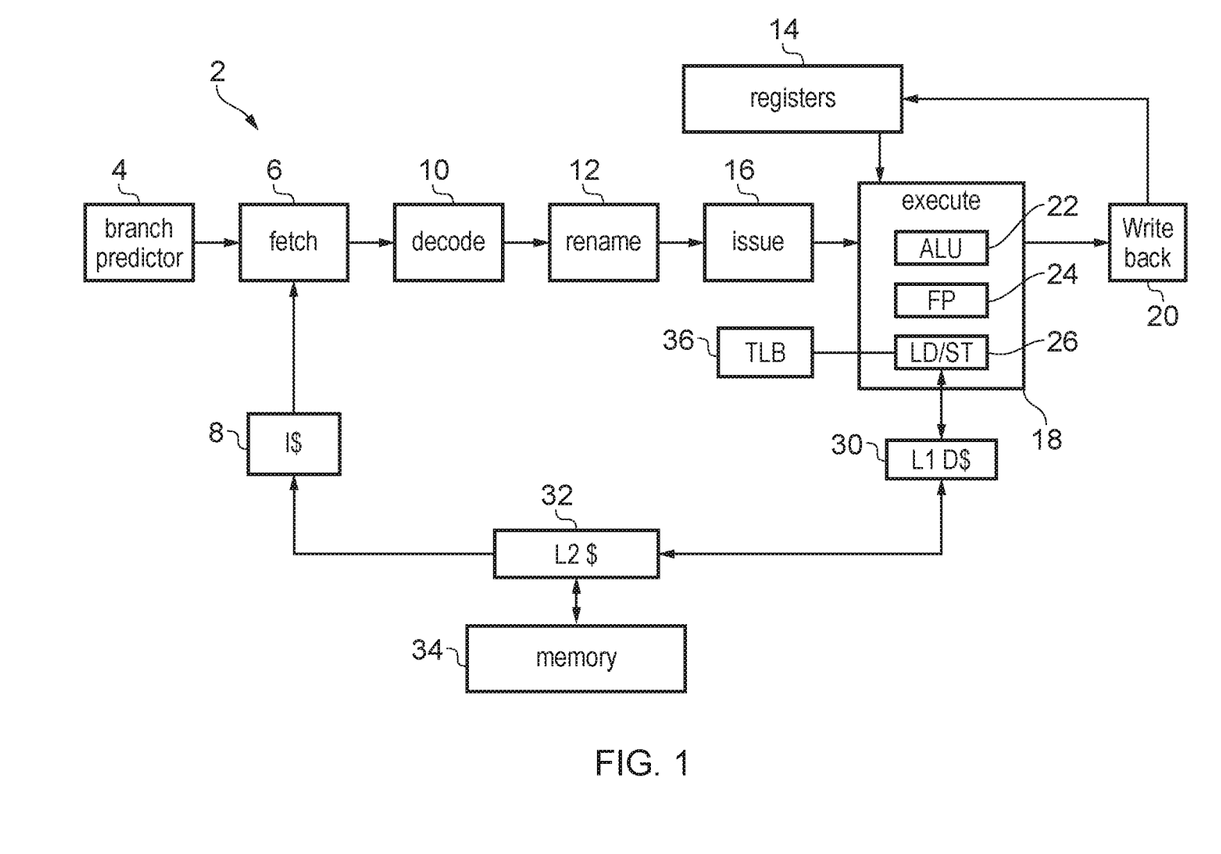
FIG. 1 schematically illustrates a data processing apparatus comprising branch prediction circuitry in one example embodiment.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of blocks of instructions to be fetched. A fetch stage 6 fetches the blocks of instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as an ALU (arithmetic logic unit) 22 for performing arithmetic or logical operations, a floating-point unit 24 for performing operations using floating-point operands, and a load/store unit 26 for performing load operations to load data from a memory system to the registers 14 or store operations to store data from the registers 14 to the memory system. In this example the memory system includes the level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Figure 2:
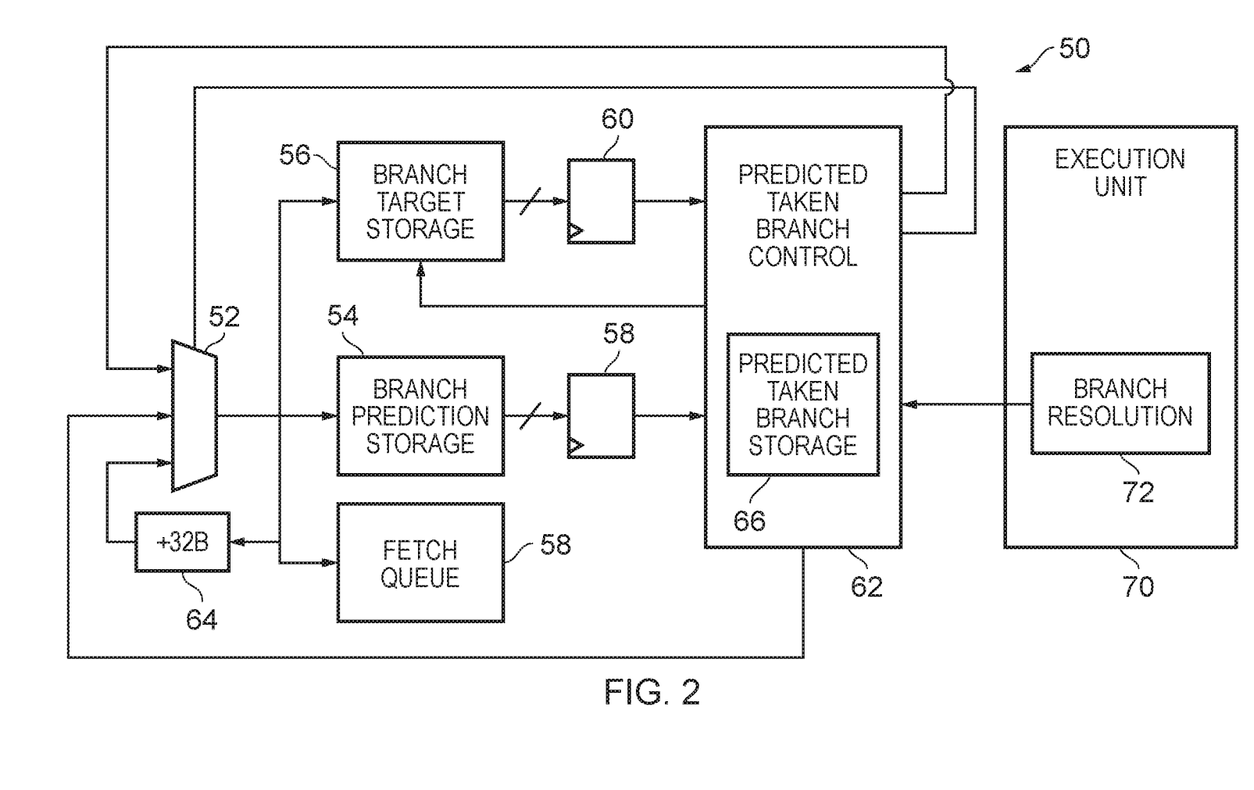
FIG. 2 schematically illustrates in more detail the branch prediction circuitry in one example embodiment.

FIG. 2 schematically illustrates some components of an apparatus 50 in one example embodiment. The selection circuitry 52 on the left of the figure provides the starting address of the next block of instructions for which the branch prediction circuitry should generate branch predictions. This indication of the block of instructions is received by the branch prediction storage 54, which may for example be in the form of a global history buffer (GHB), by the branch target storage 56 (which may for example be in the form of a set-associative branch target buffer (BTB)), and the fetch queue 58 which forms part of instruction fetch circuitry to retrieve this next block of instructions from memory. The branch prediction storage 54 and the branch target storage 56 are each arranged to perform look ups in parallel for each instruction in the block of instructions. A hit in the branch prediction storage 54 indicates that the circuitry has encountered one or more of the branch instructions in this block before and the branch prediction storage 54 then outputs one or more branch prediction indications generated for each of the branch instructions present in the block of instructions. This information is temporarily buffered in the clocked stage 58. Similarly a hit in the branch target storage 56 indicates that a target address for this branch instruction (or these branch instructions) in the block of instructions is found and as a result the branch target storage reads out the stored target address (or addresses) which are temporarily buffered in the clocked stage 60. It will be understood by one of ordinary skill in the art that when a miss occurs in either of the branch prediction storage 54 or the branch target storage 56 further mechanisms are provided to provide a default prediction in the case of the branch prediction storage 54 and to determine any required target addresses in the case of the branch target storage 56, but these mechanisms are not explicitly illustrated here merely for clarity of illustration. Further circuitry is then provided in the form of the predicted taken branch control 62, which receives the output from the clocked stages 58 and 60). Firstly, when there is at least one branch instruction predicted to be taken in the block of instructions, the predicted taken branch control passes the target address for this predicted taken branch instruction to provide one of the inputs to the selector 52. Accompanying this, the predicted taken branch control circuitry 62 also passes the taken prediction back to the selector 52 as a control over the selection which the selector 52 makes. Note that a further input to the selector 52 is the 32-byte addition block 64, which receives the starting address of the current block of instructions as an input and adds 32 bytes to it to provide as an input to the selector the starting address of the next block of instructions which sequentially follows the current block of instructions. This forms the default output of the selector 52, i.e. unless a branch is encountered which is predicted to be taken or a mispredict occurs and the branch prediction and instruction fetch need to be redirected (discussed below) then this is the output given by the selector 52.

The predicted taken branch control circuitry 62 comprises predicted taken branch storage 66. This is used to store a record of branches which have been predicted as taken, for each of which an additional indicator is stored, referred to here as a "subsequent branch status indicator" which is used to indicate whether there are any further branches in this block which are predicted to be taken by the branch prediction mechanism. When this is the case the indicator is given a value to indicate this. In this example embodiment the indicator is provided by a 1-bit value and the value indicating that there is a subsequent predicted taken branch is given by setting this bit (but it will be recognised that this choice is arbitrary and equally an unset bit could indicate this status). Otherwise the indicator has an alternative value, which in this instance is an unset bit. These stored indications of predicted taken branches are held by the predicted taken branch storage 66 until the corresponding branch is resolved. Finally, FIG. 2 also shows execution unit 70 which comprises a branch resolution unit 72, which determines the outcome of branch instructions and on resolution of a branch passes an indication of the outcome of that branch back to the predicted taken branch control 62. A look up is then performed in the predicted taken branch storage 66 to determine if this branch was predicted as taken, yet in fact was not taken, i.e. was mispredicted as taken. When this happens the additional indicator stored in association with that branch is examined. If the additional bit is not set this indicates that there were no predicted taken branches following this mispredicted taken branch in the block of instructions and therefore the branch prediction circuitry can continue its branch prediction from the next block of instructions which sequentially follows the block of instructions in which the mispredicted-as-taken branch is to be found. The predicted taken branch control 62 controls the selector 52 and provides the corresponding starting address as an input to the selector 52 to cause this to happen. Alternatively, if the indicator shows that at least one predicted taken branch followed the mispredicted-as-taken branch in the block of instructions then the target address of that subsequent predicted-as-taken branch should be used to determine the next block of instructions, i.e. the block of instructions which comprises that target address. A number of approaches to implement this are proposed. In one example, the predicted taken branch control causes a lookup to be performed in the branch target storage 56 in order to retrieve the corresponding target address (if stored there, or via the supporting mechanism if not the above mentioned supporting mechanism if not). In another example the predicted taken branch storage can be used to store additional information relating to the target address (of the subsequent predicted-as-taken branch in the block). This additional information can comprise the target address itself, though this involves a non-trivial amount of storage space (for example in a 64-bit system, this could require storage of (a 49-bit virtual address and its location). Alternatively the additional information can comprise an indication of the location of the target address, such as the index and way of the BTB, when the target address has been stored there. Storing these possibly-required branch target addresses in the BTB can be relatively reliable, since the BTB replacement rate is generally low, and a given BTB entry is relatively unlikely to victimized in the short period between branch prediction generation and resolution. When the dedicated storage 66 does store the corresponding index/way, the branch predictor doesn't need to track the whole target address, since the index part can be calculated based on the branch address of the resolved branch, and thus, only way information is required to be stored. Depending on which of the above approaches is taken, the predicted taken branch control 62 determines the starting address of the block containing that target address and passes this as an input to the selector 52 and causes that input to be provided as the output of the selector.

Figure 3A:
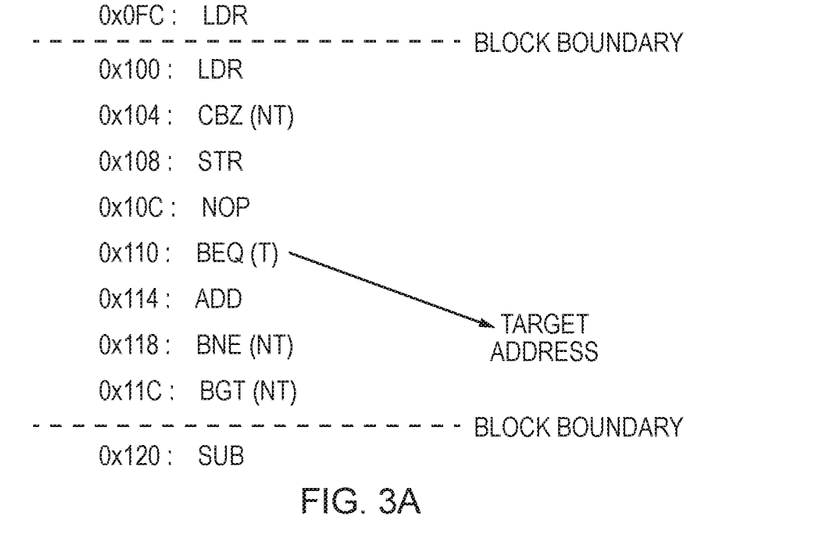
FIG. 3A illustrates an example sequence of instructions including branch instructions for which branch predictions are made.
Figure 3B:
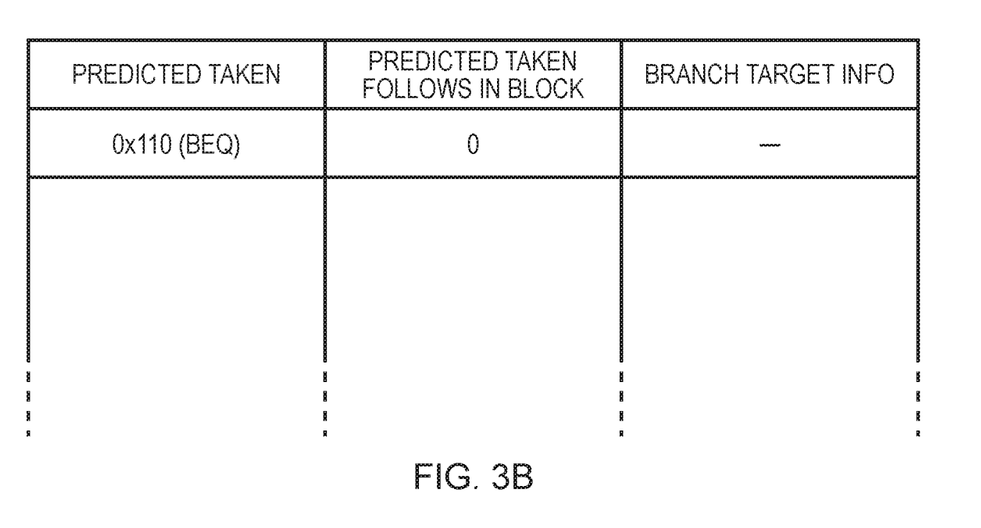
FIG. 3B schematically illustrates storage for branches predicted as taken and further indicating whether a predicted taken branch follows in example embodiments.

FIG. 3A shows an example sequence of instructions for which the branch prediction circuitry might perform branch prediction. Block boundaries are shown indicating that the blocks of instructions for which the branch prediction is performed are 32-byte aligned, with the first example instruction address of the block fully shown being 0x100 and the starting address of the subsequent block being 0x120. For each branch instruction in the block the prediction generated by the branch prediction circuitry is shown in brackets and thus it can be seen that it is for the BEQ instruction at 0x110 that the first prediction of taken occurs. The arrow indicates that it is therefore expected that the instruction flow will branch to the target address defined for the BEQ instruction. Further, note that two further branch instructions BNE at 0x118 and BGT at 0x11C are predicted as not-taken by the branch prediction circuitry. Referring then to FIG. 3B showing example content of a predicted taken branch storage such as item 66 is FIG. 2, it can be seen that an entry is created by the predicted taken branch control circuitry (such as item 62 in FIG. 2) for the predicted taken branch BEQ and indicating that there are no branch instructions behind this predicted taken branch which themselves are predicted to be taken. Were at least one of the BNE or BGT branch instructions predicted to be taken then the indicator associated with the BEQ entry in FIG. 3B would be set (i.e. 1). The additional "branch target info" column is not always implemented, but as discussed above can be provided to store additional information relating to the branch target of a branch instruction behind this predicted taken branch (in this example the 0x110 BEQ) which itself is predicted to be taken. As discussed above, this may comprise the target address itself, sufficient information to reconstruct the target address, or an indication of the location of the target address.

Figure 4:
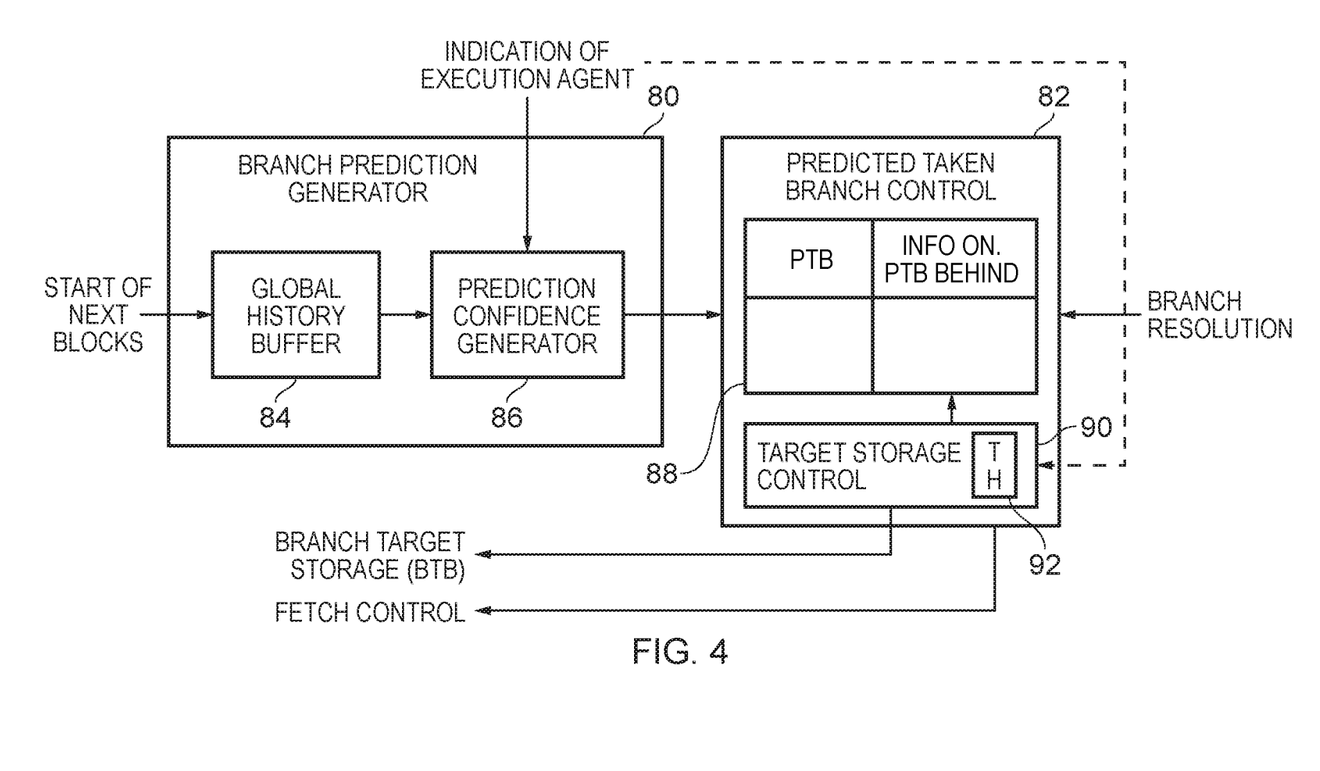
FIG. 4 schematically illustrates branch prediction circuitry in example embodiments.

FIG. 4 schematically illustrates some more detail of branch prediction circuitry in one example embodiment. Here the branch prediction circuitry (which in the example of FIG. 2 may be considered to comprise the branch prediction storage 54, the clock stage 58, and the predicted taken branch control 62) may be considered to comprise a branch prediction generator block 80 and predicted taken branch control 82. Further, the branch prediction generator 80 is arranged to process two blocks of instructions in parallel and hence the input to the branch prediction generator 80 is an indication of the next two blocks for which the branch predictor should generate its predictions. These are received by a global history buffer 84, which on the basis of previous observations of the resolution of branch instructions provides a prediction for whether each branch instruction in these two blocks will be taken, or not taken in a manner with which one of ordinary skill in the art will be familiar. The output of the global history buffer providing this prediction is received by a prediction confidence generator 86 which also forms part of the branch prediction generator 80. A prediction confidence is thus generated in association with the branch prediction. This prediction confidence may solely be based on the observed history of this branch, for example in the manner of strongly taken, weakly taken, weakly not taken, strongly not taken, yet in this example is further based on additional information, namely an indication of the current execution agent which the prediction confidence generator 86 receives. More particularly, in this example the indication of the execution agent is an indication of a thread which owns the instructions currently being executed. The prediction confidence generator can then vary the prediction confidence it generates in dependence on the owning execution agent, in order to influence the likelihood of a target address for a predicted taken branch behind the first predicted taken branch in the block being caused to be stored in the branch target storage (see below). The predicted taken branch storage (66 in the example of FIG. 2) is provided in the predicted taken branch control 82 in the example of FIG. 4 by a table 88 comprising entries which associate a predicted taken branch (PTB) with information on (any) PTBs behind that first PTB. This comprises a one-bit value which is set when at least one branch behind the predicted token branch is itself predicted to be taken. When the predicted taken branch control 82 creates a new entry in the predicted taken branch storage 88 it also makes use of its target storage control 90 which controls whether a branch target for a predicted taken branch behind the first predicted taken branch in the block is caused to be stored in the branch target storage. Here the "branch target storage" may be a separate system component (such as the BTB) or may be part of the information stored in table 88. Control arrows from target storage control 90 in FIG. 4 show control may be exerted over either or both. In one variant of the example shown in FIG. 4 this is done on the basis of the confidence value generated by the prediction confidence generator 86, by comparison of this value with a threshold value (TH) 92 to which the target storage control 90 makes reference. Thus if the prediction confidence associated with a branch prediction is below the threshold then the branch target for a predicted taken branch behind it will be caused to be stored in the branch target storage (since the likelihood is higher that this may be needed in the event that the predicted taken branch is mispredicted). Alternatively, when the prediction confidence generated in association with a predicted taken branch is at or above the threshold then the target storage control 90 suppresses the storage of the branch target (since the likelihood is lower that it will be required). In an alternative for the example shown in FIG. 4 the indication of the execution agent may be passed directly (dashed line) to the target storage control 90 and the target storage control in this example is arranged to base its control over whether a branch target for a predicted taken branch behind the first predicted taken branch is caused to be stored in the branch target storage alternatively or in addition directly on the basis of the indication of the execution agent. For example, amongst the execution agents which are active, the target storage control can be arranged to suppress storage of such additional branch targets entirely for a given execution agent, to always cause storage of such branch targets for a given execution agent, or to base the control on the confidence value associated with the branch prediction (possibly further biased up or down on the basis of the given execution agent). In this manner preferential use of the branch target storage can be granted to some execution agents over others, thus improving the likelihood that when branch misprediction of predicted taken branches is encountered that the necessary restart thereafter can happen faster. The predicted taken branch control 82 also has an output to the fetch control such that when the branch resolution information is received (as described above with reference to FIG. 2) it can cause the fetch control and branch prediction to be restarted as required.

Figure 5:
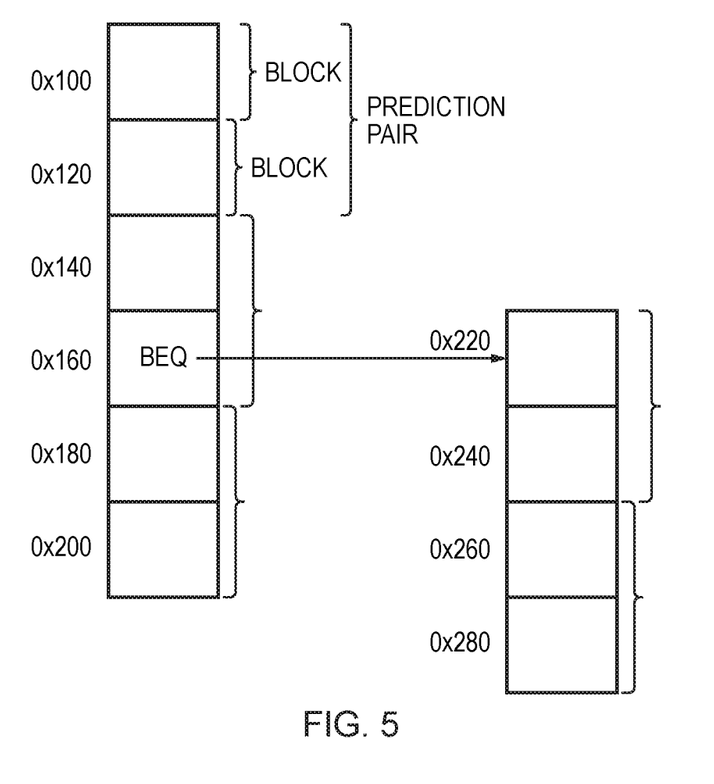
FIG. 5 schematically illustrates blocks of instructions for which branch prediction is carried out in prediction pairs in example embodiments.

FIG. 5 illustrates a set of example instructions for which branch prediction is carried out in block pairs. In the example of FIG. 5 each block is 32 bytes, such that a prediction pair spans 64 bytes of address space. At the first address shown in FIG. 5 of 0x00 this forms the first prediction address and two adjacent blocks respectively starting at 0x100 and 0x120 form one prediction transaction (a prediction pair). 0x140 and 0x160 then form the next prediction transaction. In this example the first predicted taken branch (BEQ) is encountered at 0x170 and is predicted to be taken to 0x228. Thus, the control flow is changed after 0x170 to 0x228. Where instruction address 0x228 belongs to a 32 byte aligned block starting at 0x220, the first predicted address is started at 0x220 and accordingly 0x220 and 0x240 form the starting addresses of the two blocks which pair together to form a prediction transaction. In the event that subsequently it is found that the taken prediction for the BEQ instruction at 0x170 was incorrect, i.e. the BEQ was actually not taken, then it is necessary for the branch prediction and fetch mechanism to be returned to the instructions which follow the mispredicted BEQ instruction. However, where, as described above, the fetching and branch prediction mechanism is arranged to operate on the basis of 32 byte aligned blocks of instructions, this means that absent the approach described here the next prediction transaction would have to be restarted at 0x140. However, as described above the branch resolution information, i.e. in this example the true outcome of the BEQ instruction at 0x170, is received by the branch prediction mechanism (e.g. by the predicted taken branch control of the examples of FIG. 2 and FIG. 4) and the storage of the information about the branch prediction for the branches behind the first predicted taken branch instruction in the block can be used to determine if branch prediction for the remainder of the block is in fact required. In the example of FIG. 5 this therefore applies to any branch instructions at addresses 0x174, 0x178, 0x17C. In the event that there were no predicted taken branches within these instructions in the example of the FIG. 5 then the control flow is redirected to start directly from the next block i.e. beginning at 0x180. Alternatively in the event that the BEQ predicted-as-taken (but in fact not taken) instruction was stored in the predicted taken branch storage with an indication that there are predicted taken instructions following it within the same block (i.e. that which begins at 0x160) then the branch prediction should restart to immediately follow the BEQ instruction at 0x170.

Note that in some examples the target address of a predicted taken branch behind the BEQ instruction at 0x170 is not stored, whereas in other examples the target address is cached in addition to the indication that a further predicted taken branch does follow the mispredicted branch. Depending on which variety is implemented then if the target of the predicted taken branch is cached in the predicted taken branch control then branch prediction predictor can directly skip to the block comprising that target address, but when this is not the case (i.e. when only the 1-bit indicator is stored), then the mispredicted restart address and its sequential address are pushed into the fetch address queue and the predictor will predict from the sequential address of the BEQ instruction. After the prediction for this sequential address is completed then the branch predictor pushes the corresponding target address into the fetch queue and the process continues so that branch prediction continues from the block comprising that target address.

Figure 6:
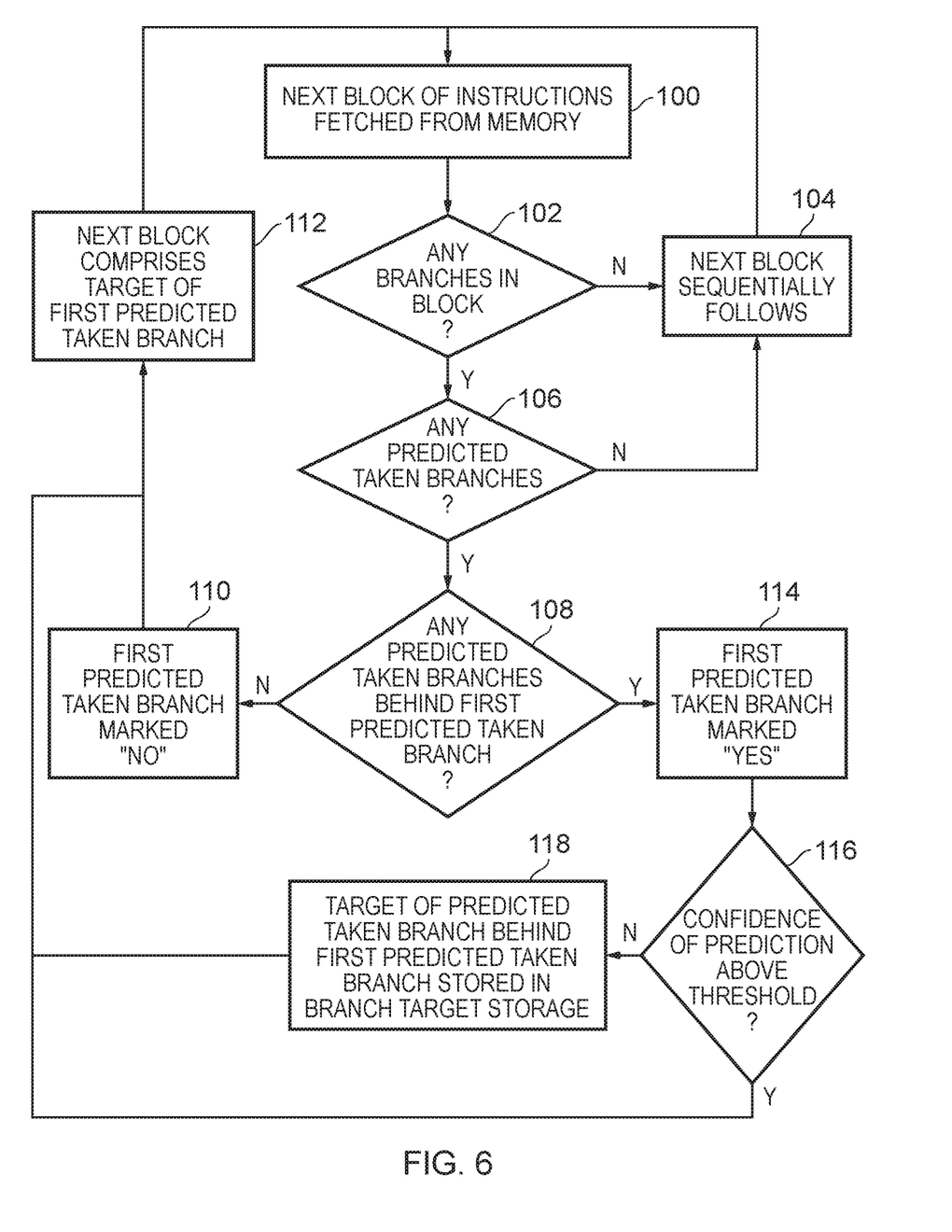
FIG. 6 shows a sequence of steps which are taken according to the method of one example embodiment according to which branch predictions for predicted taken branches are additionally labelled to indicate whether, within the block which contains that predicted taken branch, there is a further predicted taken branch.

FIG. 6 shows a sequence of steps which are taken in one example embodiment when operating branch prediction circuitry in order to perform branch prediction and store information associated with predicted taken branches within a block to indicate what follows them within that block. The flow can be considered to begin at step 100 where a next block of instructions is fetched from memory. Then at step 102 it is determined if there are any branches in the block. If there are not then the next block to be predicted will simply follow sequentially (step 104) and the flow returns to step 100. When there are branches in the block the flow proceeds to step 106 where it is determined if there are any predicted taken branches within the block. If there are not then the flow returns via step 104 to step 100. When there is at least one predicted taken branch in the block then at step 108 it is determined if there are any predicted taken branches behind a first predicted taken branch in the block. If there are not then the flow proceeds to step 110, where an entry is made in the predicted taken branch storage and marked 'no' i.e. indicating that there are no predicted taken branches behind the first predicted taken branch in the block. The flow proceeds to step 112 where the target address of the first predicted taken branch in the block is used to determine the next block for branch prediction and the flow returns to step 100. Returning to a consideration of step 108, if there are predicted taken branches behind the first predicted taken branch in the block then at step 114 an entry in the predicted taken branch storage is made for the first predicted taken branch and marked 'yes', indicating that a predicted taken branch does follow within the block. The flow proceeds to step 116 where in this example it is determined if the confidence of the prediction for the first predicted taken branch is above a preset threshold. If it is not then the flow proceeds via step 118 where the target of a predicted taken branch behind the first predicted taken branch is caused to be stored in the branch target storage (whatever form this takes, i.e. within the predicted taken branch storage, within separated dedicated storage, within a BTB, etc.). The flow then proceeds to step 112. Note that the question posed at step 116 might be different in an alternative example embodiment, for example as mentioned above with respect to FIG. 4, the determination of whether to store a target address of a predicted taken branch behind the first predicted taken branch may instead, or in addition, be based on an indication of the execution agent. In such an example embodiment whether to store the target at step 118 is then dependent on the indication of the execution agent.

Figure 7:
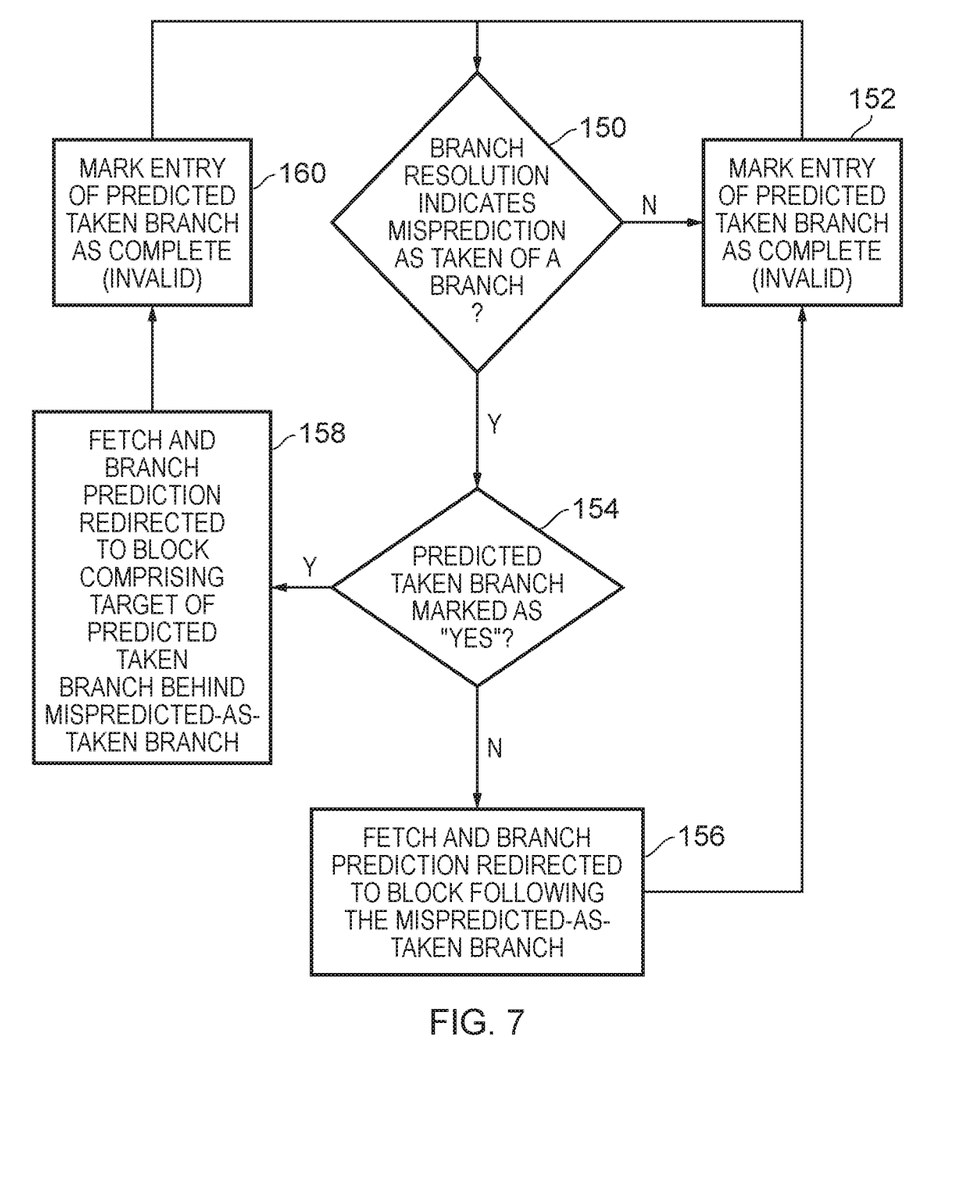
FIG. 7 is a flow diagram showing a sequence of steps which are taken in the method of one example embodiment according to which, when branch resolution indicates that a predicted taken branch has been mispredicted, the additional information stored with that taken prediction is examined to determine how the branch prediction should continue.

FIG. 7 shows a sequence of steps which are taken in one embodiment when branch resolution information is received by the predicted taken branch control from the branch resolution unit within the execution unit of the data processing apparatus. The flow can be considered to begin at step 150 where it is determined if the branch resolution outcome indicates that there has been a misprediction as taken of a branch (i.e. it was in fact not-taken). If this is not the case then the flow proceeds to step 152 where the entry for this first predicted taken branch in the block can be marked as 'complete', i.e. invalidating the entry, such that the further process of populating this table with new entries can overwrite this entry since it is no longer needed. The flow then returns to step 150. If however it is determined at step 150 that a misprediction as taken has occurred, then the flow proceeds to step 152 where the corresponding entry in the table is found and it is determined if it is marked 'yes' i.e. the bit is set indicating that there is a predicted taken branch behind this first predicted taken branch in the block. If this is not the case then the flow proceeds to step 156 where the fetch and branch prediction mechanism is redirected to the block of instructions sequentially following the block comprising the mispredicted-as-taken branch. The flow then proceeds to step 152 for the entry to be invalidated and then returns to step 150. If however, at step 154 it is found that the indication in the table shows that there is a predicted taken branch behind the mispredicted-as-taken branch, then the flow proceeds to step 158 where the instruction fetching and branch prediction mechanism is redirected to the block comprising the target of the first predicted taken branch behind the mispredicted-as-taken branch. As described above this may comprise a direct provision of that target address (and hence the block that contains it) but when this target address has been cached, but otherwise comprises the subsequent address to the mispredicted-as-taken branch being pushed into the fetch address queue. The flow then proceeds via step 160 for the table entry for the mispredicted-as-taken branch to be marked as "complete" i.e. the entry is invalidated and the flow returns to step 150.

In brief overall summary an apparatus and a method of operating the same is disclosed. Instruction fetch circuitry is provided to fetch a block of instructions from memory and branch prediction circuitry to generate branch prediction indications for each branch instruction present in the block of instructions. The branch prediction circuitry is responsive to identification of a first conditional branch instruction in the block of instructions that is predicted to be taken to modify a branch prediction indication generated for the first conditional branch instruction to include a subsequent branch status indicator. When there is a subsequent branch instruction after the first conditional branch instruction in the block of instructions that is predicted to be taken the subsequent branch status indicator has a first value, and otherwise the subsequent branch status indicator has a second value. This supports improved handling of a misprediction as taken.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   instruction fetch circuitry to fetch a block of instructions from memory; and
   branch prediction circuitry to generate branch prediction indications for each branch instruction present in the block of instructions,
   wherein the branch prediction circuitry is responsive to identification of a first conditional branch instruction in the block of instructions that is predicted to be taken to modify a branch prediction indication generated for the first conditional branch instruction to include a status indicator for subsequent branch instructions in the block of instructions,
   wherein when there is a subsequent branch instruction after the first conditional branch instruction in the block of instructions and the subsequent branch instruction is predicted to be taken the status indicator has a first value, and otherwise the status indicator has a second value.

2. The apparatus as claimed in claim 1, further comprising branch resolution circuitry to determine a resolution status for branch instructions,
   and the branch prediction circuitry is responsive to a not-taken resolution status determined by the branch resolution circuitry for the first conditional branch instruction in the block of instructions to proceed with generating branch prediction indications:
from a first instruction of a next block of instructions which subsequently follows the block of instructions, when the status indicator has the second value; and
from a first instruction of a target block of instructions to which the subsequent branch instruction leads, when the status indicator has the first value.

3. The apparatus as claimed in claim 1, wherein the status indicator is a 1-bit value.

4. The apparatus as claimed in claim 1, further comprising branch target storage, wherein the branch prediction circuitry is further responsive to the identification of the first conditional branch instruction in the block of instructions that is predicted to be taken, when there is the subsequent branch instruction after the first conditional branch instruction in the block of instructions that is predicted to be taken, to cause a target address of the subsequent branch instruction to be stored in the branch target storage.

5. The apparatus as claimed in claim 4, wherein the branch prediction circuitry comprises branch prediction confidence circuitry to generate a prediction confidence indication in association with each branch prediction indication which it generates,
and wherein storage of the target address of the subsequent branch instruction in the branch target storage is dependent on a value of the prediction confidence indication.

6. The apparatus as claimed in claim 5, wherein the branch prediction circuitry is responsive to the value of the prediction confidence indication not being above a predetermined threshold value to cause the target address of the subsequent branch instruction to be stored in the branch target storage.

7. The apparatus as claimed in claim 5, wherein the branch prediction circuitry is responsive to the value of the prediction confidence indication being above a predetermined threshold value to prevent the target address of the subsequent branch instruction from being stored in the branch target storage.

8. The apparatus as claimed in 6, wherein the branch prediction confidence circuitry is responsive to an unconditional branch to generate the prediction confidence indication in association with the unconditional branch with a value above the predetermined threshold value.

9. The apparatus as claimed in claim 4, wherein storage of the target address of the subsequent branch instruction in the branch target storage is dependent on a relative priority of an agent executing the block of instructions.

10. The apparatus as claimed in claim 9, wherein the agent executing the block of instructions is a thread within a multi-threaded execution environment.

11. The apparatus as claimed in claim 9, wherein the branch prediction circuitry comprises branch prediction confidence circuitry to generate a prediction confidence indication in association with each branch prediction indication which it generates, and the branch prediction circuitry is responsive to the relative priority of an agent executing the block of instructions when generating the value of the prediction confidence indication, and the branch prediction circuitry is responsive to the value of the prediction confidence indication being below a predetermined threshold value to cause the target address of the subsequent branch instruction to be stored in the branch target storage.

12. The apparatus as claimed in claim 1, wherein the instruction fetch circuitry is arranged to fetch a pair of blocks comprising the block of instructions from memory,
and the branch prediction circuitry is arranged to generate branch prediction indications for each branch instruction present in the pair of blocks of instructions.

13. The apparatus as claimed in claim 1, wherein the branch prediction circuitry is arranged to generate branch prediction indications for each branch instruction present in the block of instructions in a single processing cycle.

14. The apparatus as claimed in claim 1, wherein the block of instructions is aligned to a predefined multiple-byte boundary in memory.

15. The apparatus as claimed in claim 14, wherein the block of instructions is 32-byte aligned.

16. A method of branch prediction in a data processing apparatus comprising:
fetching a block of instructions from memory;
generating branch prediction indications for each branch instruction present in the block of instructions;
identifying a first conditional branch instruction in the block of instructions that is predicted to be taken; and
modifying a branch prediction indication generated for the first conditional branch instruction to include a status indicator for subsequent branch instructions in the block of instructions,
wherein when there is a subsequent branch instruction after the first conditional branch instruction in the block of instructions and the subsequent branch instruction is predicted to be taken the status indicator has a first value, and otherwise the status indicator has a second value.

17. Apparatus comprising:
means for fetching a block of instructions from memory;
means for generating branch prediction indications for each branch instruction present in the block of instructions;
means for identifying a first conditional branch instruction in the block of instructions that is predicted to be taken; and
means for modifying a branch prediction indication generated for the first conditional branch instruction to include a status indicator for subsequent branch instructions in the block of instructions,
wherein when there is a subsequent branch instruction after the first conditional branch instruction in the block of instructions and the subsequent branch is predicted to be taken the status indicator has a first value, and otherwise the status indicator has a second value.

* * * * *